Oct. 8, 1968 P. CHOWDHURI 3,405,284

BASE TRIGGERED MONOSTABLE REGENERATIVE PULSE DETECTOR CIRCUIT EMPLOYING COMPLEMENTARY SEMICONDUCTOR DEVICES

Filed Feb. 3, 1965

*INVENTOR.*
PRITINDRA CHOWDHURI
*BY* Joseph V. Claeys
HIS ATTORNEY

United States Patent Office 3,405,284

Patented Oct. 8, 1968

3,405,284

BASE TRIGGERED MONOSTABLE REGENERATIVE PULSE DETECTOR CIRCUIT EMPLOYING COMPLEMENTARY SEMICONDUCTOR DEVICES

Pritindra Chowdhuri, Schenectady, N.Y., assignor to General Electric Company, a corporation of New York Filed Feb. 3, 1965, Ser. No. 430,053
4 Claims. (Cl. 307—235)

ABSTRACT OF THE DISCLOSURE

Bipolar pulse or transient detector wherein rectifiers apply input pulses in response to their polarity to the base of a respective one of two complementary transistors of a monostable regenerative circuit causing both transistors to conduct for a time determined by the discharge time of resistance capacitance networks connected between the collector of each transistor and the base of the other transistor, each of said networks including a parallel connected diode and resistor, said diode being connected to permit discharge of the associated capacitor and to block transfer of a pulse applied to the base of one transistor to the collector of the other device.

Figures 1, 2:
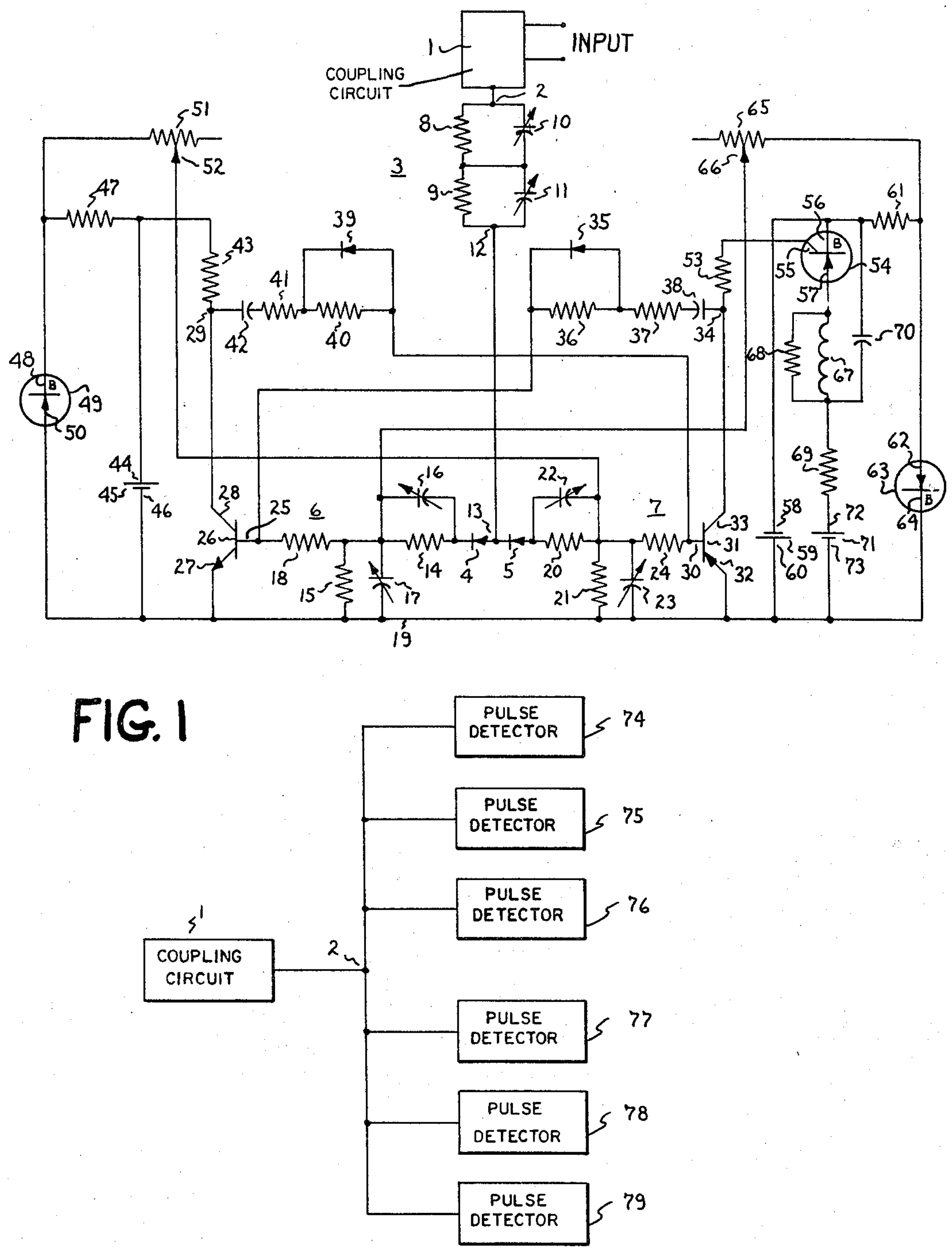

This invention relates to a voltage detector and, more specifically, a voltage pulse detector.

The voltage pulse detector of this invention is particularly useful for sensing high-frequency pulses. For example, the frequent use of semiconductor devices in power, control, and communications systems has caused a problem due to transient over-voltages produced by switching low voltage systems to become critical. High frequency transient over-voltage pulses so produced have damaging effects on the semiconductor devices, and thus these voltages are the subject of increased study and measurement, in which the present invention can be particularly useful. A problem in this study and measurement of high-frequency pulses resides in the fact that indicating devices such as counters and warning lights are not responsive to high-frequency pulses. Therefore, various circuits are used to first sense the voltage pulses and to actuate the indicating device.

Conventional pulse detectors include automatic recording oscilloscopes which are sensitive to voltage pulses, including high-frequency voltage pulses. However, each of these oscilloscopes requires a 115 volt A-C power supply and is relatively expensive to manufacture. The prior pulse detectors utilizing vacuum tubes have been found to be inadequate for sensing high-frequency pulses due to the slow response time of the vacuum tubes. The vacuum tube voltage pulse detectors have been used to sense pulses having a duration of from 50 to 100 microseconds, while voltage pulses caused by low voltage switching often have a duration shorter than 100 nanoseconds.

A number of pulse detectors utilizing semiconductor circuits have been developed. In a first of these detectors a voltage pulse is attenuated and applied between the emitter and the base of a unijunction transistor. The output of the unijunction transistor is then applied to an indicator circuit comprising a silicon controlled rectifier (SCR) and an indicator lamp. In a second pulse detector using semiconductor circuits a pulse is coupled through a specially designed coupling transformer to one of two series-triggered blocking oscillators whose outputs are coupled to a monostable switching circuit that drives a relay. In a third pulse detector circuit a voltage pulse is coupled through a flip-flop and a blocking oscillator to switch on an indicator lamp. Each of these circuits suffers from some disadvantage when it is used to sense short-duration pulses caused by a low voltage system. With respect to the first circuit, response time is limited by the relatively slow response of a single unijunction transistor. In the second circuit the response time is limited by the use of coupling transformers, which can only be made responsive to short duration pulses by expensive designing and construction. The third circuit suffers from the disadvantages of having to be reset after each operation and utilizing eight transistors in a single voltage-sensing channel.

The voltage pulse detector of the present invention has a portable power supply and is relatively inexpensive to manufacture. Furthermore, the voltage pulse detector is responsive to voltage pulses of a short duration without the use of a transformer and without having to be reset after each operation.

Accordingly, it is an object of this invention to provide an improved voltage pulse detector which is sensitive to high-frequency pulses.

It is another object of this invention to provide an improved voltage pulse detector which resets automatically after detecting a voltage pulse.

It is another object of this invention to provide an improved voltage pulse detector which is operated by an internal power supply so as to be portable.

It is a further object of the invention to provide an improved voltage pulse detector which is inexpensive to manufacture.

Yet another object of the invention is to provide an improved voltage pulse detector which can be used for sensing whether the magnitude of a voltage pulse is within a predetermined voltage range.

Briefly stated, in accordance with one aspect of the invention, I provide a voltage pulse detector which utilizes a circuit having a pair of oppositely conducting semiconducting devices which are interconnected by a plurality of energy storage means. The oppositely conducting semiconducting devices are normally in a first state of conduction which may be conducting or nonconducting. When a voltage pulse is coupled to this circuit, a first semiconductor device begins to change its state of conduction, discharging a first energy storage means through the second semiconductor device. Therefore, the second semiconductor device also begins to change its state of conduction and discharges a second energy storage means through the first semiconductor device, thereby further changing the amount of conduction of the first semiconductor device. The discharging of the energy storage means continues to regeneratively affect the semiconductor device until both of the semiconductive devices are operating in a second state of conduction. They continue to so operate in the second state of conduction until the energy storage means are discharged, at which time they return to their first state of conduction. The output from the voltage pulse detector is utilized to actuate as indicating device.

Other objects and features of the invention will be more fully understood from the following description of two embodiments of the invention and from the following drawings in which:

FIG. 1 is a schematic diagram of a voltage pulse detector constructed in accordance with the present invention; and FIG. 2 is a schematic diagram of a second embodiment of the invention wherein a plurality of voltage pulse detectors is used for sensing whether the magnitude of a voltage pulse is within the predetermined voltage range.

The embodiment of the invention shown in FIG. 1 is particularly useful as a transient voltage detector for counting transient over-voltages caused by internal switching of low voltage systems. In this preferred embodiment a coupling circuit 1 is adapted to be connected between a point at which a transient voltage is to be monitored and a junction point 2. The coupling circuit is designed to avoid the reflection of high frequency pulses which may be detected and to avoid the loading of a circuit from which the voltage pulse is being coupled. A suitable circuit of this type is found in a high resistance probe such as a Tecktronix type P6027. A circuit for detecting the presence of a voltage pulse comprises an upper voltage attenuator 3 which is connected through a pair of unilaterally conducting semiconductor devices, shown as diodes 4 and 5, to a pair of lower voltage attenuators 6 and 7. The upper attenuator 3 and the lower attenuators 6 and 7 themselves form a larger attenuator. The upper attenuator 3 comprises series connected resistors 8 and 9 connected in parallel with series connected trimmer capacitors 10 and 11, respectively. A junction point 12 between the resistor 9 and the capacitor 11 of the upper attenuator 3 is connected to a junction point 13 between the diodes 4 and 5. The lower attenuator 6 comprises resistors 14 and 15 connected in parallel with trimmer capacitors 16 and 17, respectively, and resistor 18. The resistor 14 and the capacitor 16 are connected between the diode 4 and one terminal of a resistor 18, while the resistors 15 and the capacitor 17 are connected between this terminal of the resistor 18 and a common bus 19. The lower attenuator 7 comprises resistors 20 and 21 connected in parallel with trimmer capacitors 22 and 23, respectively, and resistor 24. The resistor 20 and the capacitor 22 are connected between the diode 5 and one terminal of a resistor 24. The resistor 21 and the capacitor 23 are connected between this terminal of the resistor 24 and the common bus 19. The primary function of the attenuators 3, 6 and 7 is to attenuate a voltage pulse to a lower value without distortion.

The impedance of a high voltage portion of any attenuator should correspond to the impedance of a low voltage portion of the attenuator by a constant ratio, irrespective of the frequency and the magnitude of a voltage pulse. While a resistive voltage divider performs adequately for lower frequencies, it has been found to be inadequate for attenuating a voltage pulse of a duration less than 100 nanoseconds, particularly when the rise time of the voltage pulse may be only a few nanoseconds. It is well known in the art that at high frequencies the impedance of stray capacitances between various points of the circuit and also between the circuit and ground form a shunt for the resistive elements of a voltage divider to cause the high frequency-voltage pulse to be distorted. Therefore, trimmer capacitors such as the capacitors 10, 11, 16, 17, 22 and 23 are used to compensate for the stray capacitance. Furthermore, carbon resistors are used in any portion of the circuit where any inherent inductance of a circuit component may drive the circuit into oscillation.

The resistor 18 has one end connected to the base electrode 25 of a transistor 26. The emitter electrode 27 of the transistor 26 is connected to the common bus 19, while the collector electrode 28 is connected to a junction point 29.

The resistor 24 has one end connected to the base electrode 30 of a transistor 31. The emitter electrode 32 of the transistor 31 is connected to the common bus 19, while the collector electrode 33 is connected to the junction point 34. The transistors 26 and 31 are oppositely conducting, the transistor 26 shown as an NPN transistor and the transistor 31 shown as a PNP transistor. Both of these transistors are either conducting or non-conducting at the same time, as will be further explained hereinafter.

The base electrode 25 of the transistor 26 is connected through a parallel pulse blocking circuit comprising a diode 35 and a high resistance 36, and through a resistor 37, an energy storage means, shown as capacitor 38, and the junction point 34 to the collector electrode 33 of the transistor 31. In a similar manner, the base electrode 30 of the transistor 31 is coupled through a parallel pulse blocking circuit comprising a diode 39 and a high impedance resistor 40 and through a resistor 41, an energy storage means, shown as capacitor 42, and the junction point 29 to the collector electrode 28 of the transistor 26.

The collector electrode 28 of the transistor 26 is further connected through the junction point 29 and a collector resistor 43 to a first terminal 44 of a battery 45. A second terminal 46 of the battery 45 is connected to the common bus 19. A resistor 47 is connected between the terminal 44 and the cathode electrode 48 of a breakdown diode 49 to provide a voltage regulating circuit for biasing the transistor 31 normally nonconducting. The anode electrode 50 of the breakdown diode 49 is connected to the common bus 19. One terminal of a potentiometer 51 is connected to the cathode 48 of the breakdown diode 49, while the movable tap 52 of the potentiometer 51 couples the biasing voltage to the junction of the resistors 20 and 21 in the lower attenuator 7.

The collector electrode 33 of the transistor 31 is connected through the junction point 34, a collector resistor 53, and the gate-cathode junction of a controlled rectifier 54 which has a gate electrode 55, a cathode electrode 56, and an anode electrode 57. The cathode electrode 56 of the controlled rectifier 54 is connected to a first terminal 58 of a battery 59. The second terminal 60 of the battery 59 is connected to the common bus 19. The terminal 58 of the battery 59 is connected through a resistor 61 to the anode electrode 62 of a breakdown diode 63 to provide a voltage regulating circuit for biasing the transistor 26 normally nonconducting. The cathode electrode 64 of the breakdown diode 63 is connected to the common bus 19. One terminal of a potentiometer 65 is connected to the anode electrode 62 of the breakdown diode 63, while the movable tap 66 of the potentiometer 65 connects the biasing voltage between the resistors 14 and 15 of the lower attenuator 6.

A utilization circuit includes the controlled rectifier 54, an indicating device including a coil 67, a pair of resistors 68 and 69, a capacitor 70, and a battery 71, having terminals 72 and 73. The anode electrode 57 of the controlled rectifier 54 is connected through the resistor 68 and the coil 67 to the resistor 69. The capacitor 70 is connected in parallel with the series circuit comprising the controlled rectifier 54 and the coil 67. The terminal 72 of the battery 71 is connected to the resistor 69, and the terminal 73 of the battery 71 is connected to the common bus 19.

In operation, a voltage pulse is applied through the coupling circuit 1 and the upper attenuator 3 to the junction point 13 between the diodes 4 and 5. The voltage pulse is coupled from the junction point 13 and through either the diode 4 or the diode 5, depending upon the polarity of the voltage pulse. Assuming that this is a positive voltage pulse, it is coupled through the diode 4 and is attenuated by the attenuator 6, after which it is coupled to the base electrode 25 of the transistor 26. The diodes 4 and 5 may comprise diodes having low reverse leakage current and a fast reverse recovery time. For high-frequency applications it is desirable that the attenuator circuit adjacent the transistor which receives the pulse, such as attenuator 6 with a positive pulse, holds a charge caused by the pulse at the base of the transistor beyond a minimum time needed to affect the state of conduction of a transistor. The diodes 4 and 5 facilitate this holding function of the attenuator due to their characteristics. The fast recovery time causes them to stop conducting as soon as the short pulse terminates, while the low reverse leakage current precludes the discharging of an attenuator once recovery occurs.

The transistors 26 and 31 comprise a pair of oppositely conducting semiconductor devices both of which are normally conducting or nonconducting at the same time, depending upon the design and the intended use of the voltage pulse detector. In a preferred embodiment of the invention, the transistors 26 and 31 are normally nonconducting. The capacitors 38 and 42 are charged to a predetermined voltage level. The capacitor 38 is charged through a circuit which includes the resistor 15, the resistor 18, the resistor 36, the resistor 37, the resistor 53, the gate-cathode circuit of controlled rectifier 54, and the battery 59. The capacitor 42 is charged through resistance 21, the resistor 24, the resistor 40, the resistor 41, the resistor 43, and the battery 45.

When the positive voltage pulse coupled through the attenuator 6 overcomes the bias voltage coupled through the potentiometer 65 and the movable tap 66, the transistor 26 is caused to begin conducting. This causes the capacitor 42 to begin to discharge through the emitter-collector junction of the transistor 26, the resistor 41, the parallel circuit comprising the diode 39 and the resistor 40, and through the base-emitter junction of the transistor 31. The discharging current flowing through the base-emitter junction of the transistor 31 causes the transistor 31 to begin conducting. Therefore, the capacitor 38 begins discharging through the emitter-collector junction of the transistor 31, the resistor 37, the parallel circuit comprising the diode 35 and the resistor 36, and the base-emitter junction of the transistor 26. The discharge current flowing through the base-emitter junction of the transistor 26 causes the transistor 26 to conduct more fully, necessitating a further discharge of the capacitor 42 through the base-emitter junction of the transistor 31. This increased conduction and discharge continues regeneratively until the transistors 26 and 31 are operating in their saturation regions.

While the transistors 26 and 31 are conducting, they receive current through the collector resistors 43 and 53, respectively, besides the current which is received due to the discharge of the capacitors 38 and 42. Therefore, the transistors remain conducting as long as the capacitors 38 and 42 are discharging, after which the transistors return to their normal, nonconducting state.

When the transistor 31 begins conducting, current flows through its emitter-collector junction, and the resistor 53 as stated above. This current also flows through the gate-cathode junction of controlled rectifier 54 and the battery 59. Therefore, a gate current is injected into the SCR independently of the frequency or the magnitude of the voltage pulse which is detected. When the gate current reaches a critical level it turns on the controlled rectifier. The resistor 69 limits the magnitude of the current from the batteries 59 and 71 below the holding current level of controlled rectifier 54.

Prior to the detection of the first pulse by the voltage pulse detector, the capacitor 70 has been charged through a charging circuit which includes the resistor 69, the battery 71 and the battery 59. After a voltage pulse is detected and the gate current is injected, controlled rectifier 54 is turned on and the capacitor 70 is discharged therethrough to provide a current having a magnitude greater than the holding current level for the controlled rectifier. Once controlled rectifier 54 is turned on, it continues to conduct current until the capacitor 70 becomes discharged. At this time the magnitude of the current through controlled rectifier 54 is less than the minimum holding current level thereof and the controlled rectifier turns off de-energizing coil 67. A current is thus provided, independently of the frequency and magnitude of a voltage pulse being detected, to energize the coil 67, which may comprise a coil for an indicator such as an electrically actuated counter.

When the positive voltage pulse is coupled to the base 25 of the transistor 26, it is blocked by the diode 35 which is connected in parallel with the high resistance 36. The diode 35 and the resistor 36 are particularly desirable where the voltage pulse detector of the invention is used for detecting voltage pulses having a duration of less than 100 nanoseconds. When detecting pulses of this duration without the use of the diode 35 and the resistor 36, the pulses are coupled from the base electrode 25, through the resistor 37 and the capacitor 38 and the resistor 53 and the gate-cathode electrode of controlled rectifier 54 and to ground, either through the battery 59 or the resistor 61 and the breakdown diode 63. Therefore, the positive pulse will not change the state of conduction of the transistor 26. The diode 35 is connected in parallel with the resistor 36 so that the input positive voltage pulse is not by-passed to ground through capacitor 38, but at the same time giving minimum resistance to the discharge of the capacitor 38 through the base-emitter junction of transistor 26.

While the operation of the voltage pulse detector of the invention has been described with respect to a positive voltage pulse coupled through the diode 4 to the transistor 26, the advantages of the invention also occur when a negative pulse is coupled through the diode 5 to the transistor 31 to activate the voltage pulse detector. Furthermore, the advantages of the invention may be enjoyed through the use of semiconductor devices such as the transistors 26 and 31 which are normally conducting and are caused to change their state of conduction with the advent of a voltage pulse. As will be recognized by anyone skilled in the art, semiconductor devices other than transistors can be substituted for the transistors 26 and 31 without deviating from the spirit of the invention.

The schematic diagram shown in FIG. 2 is a diagram of a voltage pulse detector which is used for sensing whether the magnitude of a voltage pulse is within a predetermined voltage range. The coupling circuit 1 is connected to the input of a number of voltage pulse detector circuits constructed in accordance with this invention; for example, each may comprise a circuit such as that shown in FIG. 1. In this second present embodiment the coupling circuit 1 is connected to the pulse detector circuits 74, 75, 76, 77, 78 and 79, at a point in each circuit which corresponds to the junction point 2 as shown in the upper attenuator 3 in FIG. 1. Each of the circuits 74–79 is calibrated to respond to a voltage pulse over a predetermined magnitude. Thus, an indicator used in that circuit is energized when a voltage pulse coupled to the circuit is within the predetermined range of magnitude. For example, it might be desirable to detect and count the voltage pulses which have a magnitude within a predetermined number of voltage ranges. For example, the detector circuit 74 may be calibrated to respond to voltage pulses having a magnitude from in excess of 50 volts, the detector circuit 75 calibrated to respond to voltage pulses having a magnitude of in excess of 100 volts, the detector circuit 76 to a magnitude of in exess of 150 volts, etc., so that each of the detector circuits 74–79 responds to a voltage within a 50 volt increment. Therefore, when a voltage pulse having a magnitude of 125 volts is coupled through the coupling circuit 1, each of the pulse detector circuits 74, 75, is energized and indicates the presence of the voltage pulse in the range 100–150 volts. If a voltage pulse having a magnitude of 225 volts is coupled through the coupling circuit 1, the detector circuits 74, 75, 76, and 77 are energized, indicating the presence of a voltage pulse in the range 200–250 volts.

As will be apparent to one skilled in the art, when calibrating the detector circuits 74.79, allowance must be made for any D-C voltage which is present at the point where the voltage pulse is monitored since this D-C voltage can also activate the pulse detector circuits.

The invention is not limited to the embodiments shown herein or to the specific apparatus discussed above. To the contrary, the invention is capable of numerous modifications as will be recognized by those skilled in the art, without deviating from the scope thereof and should not be limited in any sense except as defined by the following claims.

What I claim as new and desire to secure by Letters Patent of the United States is:

1. A voltage pulse detector comprising:
(a) a first circuit for detecting the presence of a voltage pulse, said first circuit including a plurality of unilaterally conducting semiconductor devices,
(b) a second circuit responsive to the output of said first circuit, said second circuit including first and second oppositely conducting semiconductor devices both of which are normally nonconducting, said first oppositely conducting semiconductor device having a first input electrode and a first output electrode and said second oppositely conducting semiconductor device having a second input electrode and a second output electrode, (c) said plurality of unilaterally conducting semiconductor devices connected so that a positive voltage pulse is coupled to said first input electrode and a negative voltage pulse is coupled to said second input electrode, (d) said second circuit including a first blocking diode and a first energy storage means connected in series between said first input electrode and said second output electrode and including a second blocking diode and a second energy storage means connected in series between said second input electrode and said first output electrode, (e) said blocking diodes being connected so that a positive pulse coupled to said first input electrode is blocked from said first energy storage means by said first blocking diode and a negative voltage pulse coupled to said second input electrode is blocked from said second energy storage means by said second blocking diode, (f) said blocking diodes and said energy storage means being connected such that as the first semiconductor device begins to conduct said first energy storage means discharges through said second semiconductor device and as the second semiconductor device begins to conduct said second energy storage means discharges through said second semiconductor device, (g) said oppositely conducting semiconductor devices becoming nonconducting after said energy storage means have discharged, and (h) a utilization circuit responsive to the output of said second circuit.

2. A transient voltage pulse counter comprising:

(a) a first circuit for detecting the presence of a voltage pulse, said first circuit including a plurality of attenuator circuits for attenuating the magnitude of a voltage pulse, (b) a plurality of unilaterally conducting semiconductor devices interconnecting said attenuator circuits, (c) a second circuit responsive to the output of said first circuit, said second circuit including an NPN and a PNP transistor both of which are normally nonconducting, (d) said plurality of unilaterally conducting semiconductor devices being connected so that a positive pulse is coupled to the base electrode of the NPN transistor and a negative pulse is coupled to the base electrode of the PNP transistor, (e) said second circuit including a first blocking diode and a first storage capacitor connected in series between the base electrode of the NPN transistor and the collector electrode of the PNP transistor and including a second blocking diode and a second storage capacitor connected in series between the base electrode of the PNP transistor and the collector electrode of the NPN transistor, (f) said blocking diodes being connected so that a positive pulse coupled to the base electrode of said NPN transistor is blocked from said first storage capacitor by said first blocking diode and a negative voltage pulse coupled to the base electrode of said PNP transistor is blocked from said second storage capacitor by said second blocking diode, (g) said blocking diodes and said storage capacitors being connected such that as the NPN transistor begins to conduct said first storage capacitor discharges through the PNP transistor and as the PNP transistor begins to conduct said second storage capacitor discharges through said NPN transistor, (h) said transistors becoming nonconductive after said storage capacitors have discharged, and (i) a pulse counter circuit responsive to the output of said second circuit, said pulse counter circuit including a counter coil, a controlled switching means, said counter coil connected to said controlled switching means and said energy storage means, and an energy storage means, said controlled switching means being turned on to discharge said energy storage means through said counter coil in response to the output of said second circuit, and said controlled switching means being turned off after said energy storage means discharges.

3. A transient voltage pulse counter according to claim 2, wherein one of said attenuator circuits is connected between said unilaterally conducting semiconductor devices and said NPN transistor and another of said attenuator circuits connected between said plurality of unilaterally conducting semiconductor devices and said PNP transistor, the last-mentioned attenuator circuits also holding the charge from the coupled voltage pulses at the base electrodes NPN and the PNP transistors, said unilaterally conducting semiconductor devices having a low reverse leakage current and a fast recovery time so that they delay the discharging of said last-mentioned attenuator circuits.

4. In a transient voltage pulse counter for counting the number of voltage pulses within a predetermined voltage range, a plurality of transient voltage pulse counter circuits each of which comprises:

(a) a first circuit for detecting the presence of a voltage pulse, said first circuit including a plurality of attenuator circuits for attenuating the magnitude of a voltage pulse, (b) a plurality of unilaterally conducting semiconductor devices interconnecting said attenuator circuits, (c) a second circuit responsive to the output of said first circuit, said second circuit including an NPN and a PNP transistor both of which are normally nonconducting, (d) said plurality of unilaterally conducting semiconductor devices being connected so that a positive pulse is coupled to the base electrode of the NPN transistor and a negative pulse is coupled to the base electrode of the PNP transistor, (e) said second circuit including a first blocking diode and a first storage capacitor connected in series between the base electrode of the NPN transistor and the collector electrode of the PNP transistor and including a second blocking diode and a second storage capacitor connected in series between the base electrode of the PNP transistor and the collector electrode of the NPN transistor, (f) said blocking diodes being connected so that a positive pulse coupled to the base electrode of said NPN transistor is blocked from said first storage capacitor by said first blocking diode and a negative voltage pulse coupled to the base electrode of said PNP transistor is blocked from said second storage capacitor by said second blocking diode, (g) said blocking diodes and said storage capacitors being connected such that as the NPN transistor begins to conduct said first storage capacitor discharges through the PNP transistor and as the PNP transistor begins to conduct said second storage capacitor discharges through said NPN transistor, (h) said transistors becoming nonconductive after said storage capacitors have discharged, (i) a pulse counter circuit responsive to the output of said second circuit, said pulse counter circuit including a counter coil, a controlled switching means, said counter coil connected to said controlled switching means and said energy storage means, and an energy storage means, said controlled switching means and said energy storage means, and an energy storage means, said controlled switching means being turned on to discharge said energy storage means through said counter coil in response to the output of said second circuit, and said controlled switching means being turned off after said energy storage means discharges, and (j) said plurality of transient voltage pulse counter circuits being responsive to voltage pulses of a plurality of predetermined voltage magnitudes.

References Cited

UNITED STATES PATENTS

| | | | |
|---|---|---|---|
| 3,103,595 | 9/1963 | Logue | 307—88.5 |
| 3,131,362 | 4/1964 | Dersch | 331—60 |
| 3,193,701 | 7/1965 | Lawhon | 307—88.5 |

ARTHUR GAUSS, *Primary Examiner*,

S. D. MILLER, *Assistant Examiner*.